Sept. 7, 1954     T. C. BRAZIL ET AL     2,688,185
SWAGED FASTENER REMOVAL TOOL
Filed June 17, 1952
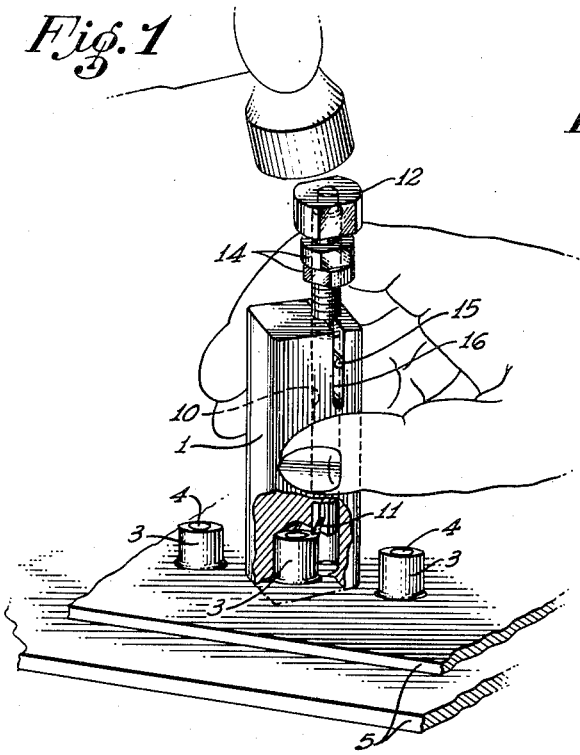
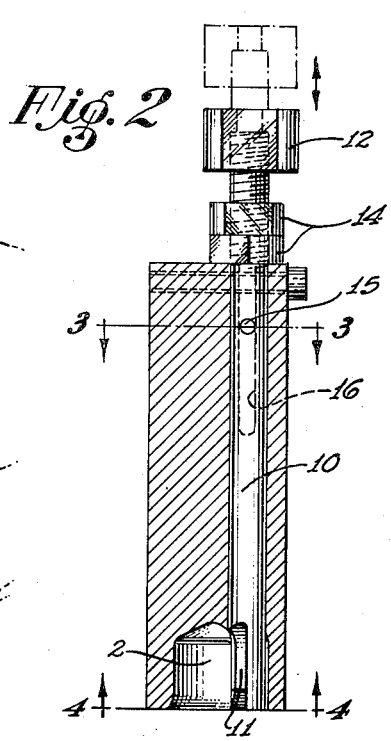
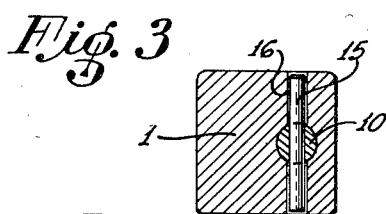
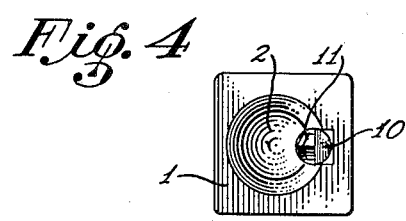
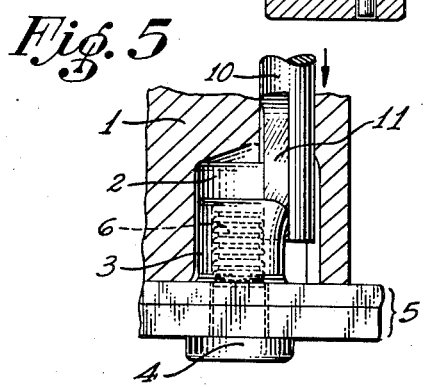
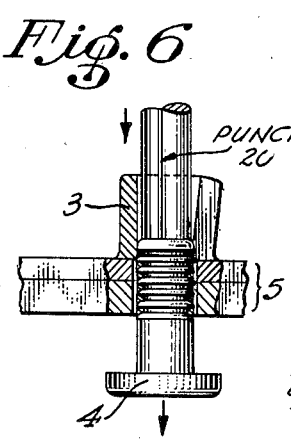
INVENTORS:
THOMAS C. BRAZIL
DONALD L. FISK
BERTELL F. PRIVETT
THEIR PATENT ATTORNEY Patented Sept. 7, 1954

2,688,185

UNITED STATES PATENT OFFICE 2,688,185

SWAGED FASTENER REMOVAL TOOL

Thomas C. Brazil, Los Angeles, Donald L. Fisk, Lynwood, and Bertell F. Privett, Hawthorne, Calif., assignors to Northrop Aircraft, Inc., Hawthorne, Calif., a corporation of California Application June 17, 1952, Serial No. 293,892

4 Claims. (Cl. 30—91)

The present invention relates to means for removing swaged fasteners, and more particularly to a tool for removing relatively soft collars swaged on grooved bolts of relatively hard material.

It is an object of this invention to provide a sample tool for removing, without damage to a work piece, collars swaged on grooved bolts similar to those known in the trade as "Huck Lock Bolts" for example. In this type of fastener the bolt body is too hard to be upset or headed, so a collar of relatively soft material, such as an aluminum alloy, is swaged by a tool into grooves in the bolt shank adjacent the unheaded end of the bolt and with an edge abutting the work. For various reasons such bolts may have to be removed, and when the soft swaged collars are split by hand lengthwise to avoid imposing transverse forces on the bolt which might distort the workpiece around the bolt, damage to the surface of the work piece in which the bolt is inserted often occurs.

In one form, the present device is a tool having a cavity at one end generally fitting over the collar swaged circumferentially around the shank end of a hard body type of grooved bolt, and resting on the surface of the work piece in which the bolt is inserted. A rod having a cutting end is slideably mounted in the tool, parallel to but offset from the axis of the bolt with the other end projecting above the top of the tool so that a hammer blow for example, can be applied to the rod. The cutting end of the rod is originally positioned over the edge of the swaged collar and as it travels through the length of the collar toward the work piece under the urge of the blow, the soft material of the collar is cut through toward the workpiece inwardly from its outer edge to close to the hard material of the grooved portion of the bolt shank on which the collar was swaged. With the collar cut, the fastening is so weakened that the bolt can readily be punched out of the work piece. To prevent damage to the work piece, a stop is provided preventing the cutting end of the rod from contacting the outer surface of the work piece.

One particular preferred form of the present invention is shown in the drawings in which:

Figure 1 is a perspective view of a tool in use.

Figure 2 is a longitudinal sectional view of the tool shown in Figure 2.

Figure 3 is a cross sectional view taken as indicated by the line 3—3 in Figure 2.

Figure 4 is an end elevational view taken as indicated by the line 4—4 in Figure 2.

Figures 5 and 6 are fragmentary views partly in section and partly in elevation showing the operation of collar and bolt removal.

Figure 7 is a perspective view of a collar removed by the tool of the present invention.

Referring to the drawings a tool body 1 is provided at one end with a cylindrical cavity 2 generally fitting over the swaged collar 3 of a bolt 4 inserted in a work piece 5. In this type of fastener, the bolt is retained by a collar, usually of aluminum alloy, and this collar is swaged by a compressing tool into grooves 6 on the unheaded end of bolt 4 which may be of hardened steel for high shear resistance as best shown in Figure 5. Tools having cavities 2 of various diameters to accommodate bolts and collars of various diameters, can readily be provided.

Offset from the longitudinal axis of the cavity 2 is a collar cutting rod 10 slidably mounted in the tool body 1 to move parallel to the axis of the cavity along one side of the cavity, this rod having on the cavity end thereof a cutting edge 11 positioned to pass only through the relatively soft material of the swaged collar 3 close to locking grooves 6 on the bolt 4 when the rod 10 is driven toward the work piece 5. Rod 10 is long enough to project beyond the other end of tool body 1 and terminates in a striker 12 to take a hammer blow, as shown in Figure 1.

To prevent the cutting edge 11 from entering the work the rod 10 is threaded below the striker, and stop nuts 14 are mounted to rotate on the threads. These nuts are adjusted to prevent edge 11 from entering the work, and are re-adjusted whenever rod 10 is shortened by sharpening edge 11. A rod cross pin 15 operating in tool body slots 16 prevents the rod 10 from twisting and causing misalignment of the cutting edge with respect to the tool body 1.

In operation, the tool is placed on the work piece 5 with the swaged collar 3 of a grooved bolt 4 in cavity 2 and with the cutting edge 11 of the rod 10 resting on the collar, as shown in Figure 1. Under a hammer blow, rod 10 is driven downwardly, the cutting edge 11 cutting through the side of collar 3 from its upper edge to its lower edge in contact with the work. It is preferred that the cutting edge 11 be made wedge shaped, so that the top of the collar during the cut is forced outwardly as shown in Figure 6. This action causes part of the collar material in the grooves near the outer part of the bolt shank, to be moved out of the grooves, and loosens the collar material in the grooves 6.

As shown in Figure 6 a punch 20 can be applied to the collar retained end of the bolt and the bolt punched out of the work piece, the material of the collar left in the grooves 6 being sheared from the remainder of the collar, leaving the collar as shown in Figure 7.

While in order to comply with the statue, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Means for removing a swaged collar of relatively soft material abutting a workpiece from the end of a grooved bolt projecting from the workpiece by cutting through the collar parallel to the axis of the bolt which comprises; a tool body having a cylindrical cavity at one end thereof sized to generally fit around said swaged collar with the end of said tool body in contact with said work piece, only on the side from which the bolt projects and with the axis of the body extending parallel with the axis of the bolt; a cutting rod mounted to slide longitudinally in said tool body parallel with the longitudinal axis of the bolt, said rod having a cutting end offset from the axis thereof, said rod projecting beyond the other end of said tool body so that a force causing said cutting end to traverse the collar can be applied axially to said rod, said cutting end being positioned and shaped to cut through the material of said collar only from the edge spaced from the workpiece toward the edge abutting the workpiece and close to the adjacent bolt material when said force is applied, thereby weakening said collar to the point where said bolt can be punched out of said collar and said work piece.

2. Apparatus in accordance with claim 1 wherein adjustable stop means are provided on said cutting rod and tool cooperating to limit the stroke of said rod under said force toward said work piece to approximately the level of the upper surface of said work piece to prevent damage thereto; said stop means comprising lockable means mounted on the projecting end of said rod, adjustment of said stop means enabling shortening of the cutting tool caused by sharpening the cutting end thereof to be compensated for.

3. Apparatus as set forth in claim 1 and in addition comprising interfitting parts on said cutting rod and tool body to prevent the rod from twisting in, and misalignment of the cutting edge of the tool with respect to the tool body.

4. Apparatus as set forth in claim 3 and in which said interfitting parts comprise a pin passed through and projecting from a traverse hole in said rod, and longitudinal slots in the body in which slots the projecting ends of said rod are guided.

References Cited in the file of this patent

UNITED STATES PATENTS

| Number | Name | Date |
|---|---|---|
| 1,362,354 | Rouse | Dec. 14, 1920 |
| 1,658,418 | Rinallo | Feb. 7, 1928 |
| 2,414,073 | Turner | Jan. 7, 1947 |